United States Patent Office 3,496,247
Patented Feb. 17, 1970

3,496,247
PROCESS FOR PREPARING HEXADIENES
Sadao Yuguchi and Masao Iwamoto, Ohtsu-shi, and
Akihisa Miyake and Go Hata, Kamakura-shi,
Japan, assignors to Toyo Rayon Kabushiki Kaisha,
Tokyo, Japan, a corporation of Japan
No Drawing. Filed May 20, 1966, Ser. No. 551,557
Claims priority, application Japan, May 25, 1965,
40/30,367; Aug. 2, 1965, 40/46,595; Sept. 20,
1965, 40/57,135; Sept. 21, 1965, 40/57,389;
Oct. 4, 1965, 40/60,282
Int. Cl. C07c 11/12; B01j 11/82, 11/00
U.S. Cl. 260—680                                    7 Claims

ABSTRACT OF THE DISCLOSURE

A process for preparing hexadienes by the addition reaction of an α-monoolefin with a conjugated diene in the presence of a catalyst composition comprising:
 (I) a cobalt compound selected from
  (1) inorganic salts of cobalt;
  (2) carboxylates of cobalt; and
  (3) complexes of cobalt with a member selected from beta-ketones and beta-keto carboxylic acid esters;
 (II) a phosphorus compound selected from the group consisting of the phosphorus compounds having the following formulas:
  (1) $PR_mX_{3-m}$,
  (2) $P(OR)_nX_{3-n}$, and
  (3) $P(Z)X_3^2$
  wherein R is a member selected from the group consisting of alkyls, aryls, and substituted aryls, X is a member selected from the group consisting of hydrogen, halogens, alkyls and aryls, $X^2$ is a member selected from the group consisting of halogens and halogen-substituted alkoxys, Z is a member selected from the group consisting of sulfur and oxygen, $m$ is an integer selected from the group consisting of 0, 1, 2, 3, and $n$ is an integer selected from the group consisting of 1, 2, and 3; and
 (III) an organoaluminum compound selected from the group consisting of the compounds having the following formulas:
  (1) $R_3^2Al$, and
  (2) $R_4^2Al_2SO_4$
  wherein $R^2$ is a monovalent hydrocarbon group.

This invention relates to a process for preparing hexadienes. More particularly, the invention relates to a process for preparing hexadienes in good yield by reacting alpha-olefins with conjugated diolefinic hydrocarbons in the presence of a new catalyst composition consisting of a compound of cobalt, a phosphorus compound and an organoaluminum compound.

The hexadienes are compounds having various valuable uses as intermediates. Recently, the 1,4-hexadienes have been attracting attention particularly as the third component for imparting sulfur vulcanizability to the ethylene-propylene copolymer, the so-called ethylene-propylene rubber.

It has been known to prepare 1,4-hexadienes by reacting ethylene with 1,3-butadiene in the presence of the following catalysts. For example, United States Patent 3,152,195 discloses a process wherein is used rhodium chloride as catalyst. On the other hand, French patent specification 1,388,305 discloses a process wherein a combination of a nickel-phosphorus complex and an organometallic compound is used as catalyst.

However, the rhodium chloride which is used as catalyst in the former process is very costly. Hence the production cost inevitably rises when this compound is used. On the other hand, in the latter process the selectivity for the intended hexadienes is not satisfactory.

It is therefore an object of the present invention to provide a process for obtaining the intended hexadienes in good yield and with high selectivity by reacting alpha-olefins with conjugated diolefinic hydrocarbons in the presence of a new catalyst whose cost more is low.

Another object of this invention is to provide a new catalyst composition which not only is inexpensive but whose activity is exceedingly great.

A further object of this invention is to provide a process for preparing hexadienes whereby the desired hexadienes can be obtained in good yield and with high selectivity by a choice of the conjugated diolefins and a choice of the catalytic components which are available in a great variety.

Other objects and advantages of the invention will be apparent from the description which follows.

The foregoing objects of this invention are attained by a process for preparing hexadienes in accordance with the invention which is characterized in that an alpha-olefin and a conjugated diolefin are catalyzed with a catalytic composition comprising the following three components:
 (I) a cobalt compound selected from the group consisting of:
  (1) inorganic salts of cobalt, including the halides, thiocyanate, sulfate, nitrate and carbonate,
  (2) carboxylates of cobalt, and
  (3) complexes of cobalt and beta-diketones or beta-keto carboxylic acid esters.
 (II) a phosphorus compound selected from the group consisting of the phosphorus compounds having the following formulas:
  (1) $PR_mX_{3-m}$,
  (2) $P(OR)_nX_{3-n}$, and
  (3) $R(Z)X_3^2$
  wherein R is alkyl, aryl or substituted aryl, X is hydrogen, halogen, alkyl or aryl, $X^2$ is halogen or halogen-substituted alkoxy, Z is sulfur or oxygen, $m$ is 0, 1, 2 or 3, and $n$ is 1, 2 or 3; and
 (III) An organoaluminum compound selected from the group consisting of the compounds having the following formulas:
  (1) $R_1^2AlX_{3-l}^3$ and
  (2) $R_4^2Al_2SO_4$
  wherein $R^2$ is a monovalent hydrocarbon group, $X^3$ is hydrogen or halogen, and $l$ is 1, 1.5, 2 or 3.

The cobalt compound to be used as the first component of the catalyst according to this invention comprehends the inorganic salts, carboxylates and complexes and complexes of beta-ketone or beta-keto carboxylic acid esters.

The inorganic salts of cobalt are specifically exemplified by the cobalt halides such as cobalt (II) chloride, cobalt (III) chloride, cobalt (II) bromide and cobalt (III) bromide; cobalt thiocyanate; cobalt sulfate; cobalt nitrate; and cobalt carbonate.

The carboxylates of cobalt are the salts of aliphatic or aromatic carboxylic acids. Typical examples of the carboxylates of cobalt include the cobalt salts of the linear saturated monocarboxylic acids such as formic acid, acetic acid, propionic acid, caproic acid, palmitic aid and stearic acid; the cobalt salts of the linear unsaturated monocarboxylic acids such as acrylic acid, vinylacetic acid, methacrylic acid and 10-undecenoic aid; the obalt salts of the linear saturated dicarboxylic acids such as adipic acid, azelaic acid, sebacic acid and decane-1,10-dicarboxylic acid; and the cobalt salts of linear unsaturated dicarboxylic acid such as muconic acid. Further, typical examples of the cobalt salts of the alicyclic carboxylic acids are the cobalt salts of cyclohexanecarboxylic acid and cyclo hexanedicarboxylic acid. On the other hand, as the cobalt salts of ahe aromatic carboxylic acids, included are the cobalt salts of the aromatic monocarboxylic acids such as benzoic acid salicylic acid and naphthalene carboxylic acid and the cobalt salts of the aromatic dicarboxylic acids such as terephthalic acid, isophthalic acid, phthalic acid and naphthalene dicarboxylic acid. In addition, also usable in like manner are the cobalt salts of aliphatic carboxylic acids having an aromatic substituent group such as phenylacetic acid and phenylpropionic acid.

The beta-diketone or beta-keto carboxylic acid ester compounds of cobalt include trisacetylacetonatocobalt (III) bisacetylacetonatocobalt (II), acetylacetonatodichlorocobalt (III), trisbenzoylacetonatocobalt (III), bisbenzoylacetonatocobalt (II), trispropionylacetonatocobalt (III), bispropionylacetonatocobalt (II) cobalt (III) ethylacetoacetate, cobalt (III) ethylbenzoylacetate.

Of these cobalt compounds, particularly preferred are cobalt (II) chloride, trisacetylacetonatocobalt (III) and cobalt (II) acetate.

The phosphorus compound to be used as the second component of the catalyst according to this invention include the following compounds.

The compounds represented by the formula $PR_mX_{3-m}$ are typically exemplified by phosphorus (III) chloride, phosphous (III) bromide, trimethyl phosphine, triethyl phosphine, tributyl phosphine, triphenyl phosphine, tricresyl phosphine, phenyl diethyl phosphine, cresyl diphenyl phosphine, phenyl dichlorophosphine, diphenyl chlorophosphine, dimethyl phosphine, diethyl phosphine, dibutyl phosphine.

Typical examples of the compounds represented by the formula $P(OR)_nX_{3-n}$ include diphenyl chlorophosphite $[(C_6H_5O)_2PCl]$, phenyl dichlorophosphite, bis (p-chlorophenyl) chlorophosphite, o-chlorophenyl dichlorophosphite, o-chlorophenyl dibromophosphite, m-toluyl dichlorophosphite, p-biphenyl dichlorophosphite, diphenyl benzenephosphinate, diphenyl butylphosphinate, butylphosphinic dichloride, butylphosphinic dichloride.

Of these compounds, the phosphite compounds in which R is alkyl, aryl or alkyl- or halogen-substituted aryl and X is halogen are convenient considering the activity of the resulting catalyst.

On the other hand, the compounds represented by the formula $R(Z)X_3^2$ are typically exemplified by phosphorylchloride, thiophosphorylchloride and 2,3-dichloropropyl phosphonate.

While it is possible to use as the second component of the catalyst of this invention those selected from a wide range as hereinabove indicated, the use from among these of those which possess at least one chlorine atom directly attached to the phosphorus atom is particularly desirable from the standpoint of the activity of the resulting catalytic composition.

Thus, the phosphorus compounds of the formula (1) $PR_mX_{3-m}$, (2) $P(OR)_nX_{3-n}$ or (3) $P(Z)X_3^2$, where R is alkyl, aryl or alkyl- or halogen-substituted aryl, X and $X_2$ is chlorine, Z is sulfur or oxygen, $m$ is 1 or 2, and $n$ is 1, or 2, can be especially conveniently used.

The organoaluminum compound of the formula $R_1^2AlX_{3-i}^3$, which is used as the third component of the catalyst according to this invention, is preferably one in which R is alkyl, and particularly a lower alkyl group. Examples of these compounds include the trialkylaluminums such as triethylaluminum, tri-n-propylaluminum, triisopropylaluminum, and triisobutylaluminum, the dialkylaluminum monohalides such as diethylaluminum monochloride, diethylaluminum monobromide, diethylaluminum monoiodide, diisobutylaluminum monochloride and diisobutylaluminum monobromide, the alkylaluminum dihalides such as ethylaluminum dichloride, ethylaluminum dibromide, isobutylaluminum dichloride, isobutylaluminum dibromide and isobutyl aluminum diiodide, the alkylaluminum sesquihalide such as ethylaluminum sesquichloride, ethylaluminum sesquibromide, isobutylaluminum sesquibromide and hexyaluminum sesquichloride, and the alkylaluminum hydrides such as diethylaluminum hydride and diisobutylaluminum hydride. These compounds can be used alone or as a mixture.

On the other hand, as the organoaluminum compound of the formula $R_4^2Al_2SO_4$, included are such as bis(diethylaluminum) sulfate, bis(dimethylaluminum) sulfate, bis(dibutylaluminum) sulfate, diethylaluminum-dimethylaluminum sulfate, di-n-propylaluminum-di-iso-propylaluminum sulfate, bis(didodecylaluminum) sulfate, bis(diphenylaluminum) sulfate, dibenzylaluminum-diphenylaluminum sulfate.

The mole ratio of the aforesaid phosphorus compound to the cobalt compound is preferably from 0.5 to 30, particularly from 2 to 10. On the other hand, the mole ratio of the organoaluminum compound to the cobalt compound is preferably from 1 to 200, and particularly from 5 to 30.

According to this invention, it is also possible to form a complex first by reacting the cobalt compound, the first component, with the phosphorus compound, the second component, and then activate the so formed cobalt-phosphorus compound complex with the organo-aluminum compound, the third component. Thus, it matters little in what sequence the several components of the invention catalyst are added. They can either be added to the reaction system at the same time or in an optional order.

The invention catalytic composition is generally added to the reaction system in catalytic amounts. This amount can be expressed as 0.0001–0.2 mol for every mol of the conjugated diene.

According to this invention, the alpha-olefins and conjugated diolefinic hydrocarbons are catalyzed by the hereinbefore-described three-component catalyst system.

The alpha-olefins, which are used in the present invention as the starting material, are those hydrocarbons of the formula $R—CH=CH_2$, where R is hydrogen or an alkyl group of 1–8 carbon atoms. Included, for example, are ethylene, propylene, butene-1, pentene-1, hexene-1 and heptene-1, particularly preferred being ethylene and propylene.

The conjugated diolefinic hydrocarbons, which are used in this invention as the other starting material, are either 1,3-butadiene or the alkyl or aryl-substituted 1,3-butadienes. Of these compounds, those suitably used in the invention process are 1,3-butadiene and the 2-alkyl-1,3-butadienes, 4-alkyl-1,3-butadienes, 2,3-dialkyl-1,3-butadienes, 1,4-alkyl-1,3-butadiene and 2,4-dialkyl-1,3-butadiene (the alkyl groups here indicated are those of 1–20 carbon atoms, and preferably 1–6 carbon atoms). Thus, as typical compounds can be mentioned 1,3-butadiene, isoprene, 2-ethyl-1,3-butadiene, 1,3-pentadiene, 1,3-hexadiene, 2,4-hexadiene, 2,3 - dimethyl - 1,3 - butadiene, 2,3-diethyl-1,3-butadiene and 2-methyl-1,3-pentadiene. Moreover, as aryl substituted-1,3-butadiene, 2-phenyl-1,3-butadiene may be used. Generally, the use of 1,3-butadiene and isoprene are to be preferred.

The alpha-olefins and conjugated diolefinic hydrocarbons are reacted stoichiometrically of course, but is not necessarily required that these reactants are present in the reaction system in equivalent quantities. For example, the reaction may be made to proceed by merely introducing the alpha-olefin into the reaction system, in the case where the total amount of the conjugated diolefinic hydrocarbon has been added to the system in advance.

In those instances where the conjugated diolefinic hydrocarbon is liquified in the reaction system, the use of a solvent may be dispensed with. However, for minimizing as much as possible the occurrence of a reaction between the conjugated diolefinic hydrocarbon and enhancing the amount formed of the intended hexadienes, preferred is the use of a suitable solvent, consideration being given to the dispersibility and solubility of the catalyst.

Conveniently usable as such a solvent are the hydrocarbons such as pentane, heptane, cyclohexane, benzene, toluene and xylene and the halogenated hydrocarbons such as chlorobenzene, bromobenzene, methylene chloride, 1,2-dichloroethane and 1,3-dichloropropane. Further, if a substances which is gaseous at room temperature such as propane and butane is used as the solvent, the separation of the solvent by means of distillation is made much more easy.

According to the invention process, there are no particular restrictions as to the reaction temperature and pressure as well as the other reaction conditions, variations of these conditions over a broad range being possible.

Now, if mention is made of the convenient ranges for these conditions, a reaction temperature ranging between −10° and 250° C. is convenient, a range between 10° and 150° C. being especially desirable. On the other hand, the reaction pressure may be either normal atmospheric or superatmospheric. In general, a pressure of 5–300 kg. per square centimeters is conveniently used depending upon the alpha-olefin used.

Then the desired hexadienes can be synthesized by the invention process by suitably varying the conditions within the ranges indicated hereinabove of the present invention. For example, when ethylene is used as the alpha-olefin, the relationship between the class of the conjugated diolefinic hydrocarbon used and the resulting hexadienes are, in general, as follows.

(1) 1,3-butadiene→1,4-hexadiene, 2,4-hexadiene, 1,3-hexadiene.
(2) 2-alkyl-1,3-butadiene→5-alkyl-1,4-hexadiene, 4-alkyl-1,4-hexadiene, 2-alkyl-2,4-hexadiene, 3-alkyl-2,4-hexadiene.
(3) 4-alkyl-1,3-butadiene→3-alkyl-1,4-hexadiene, 6-alkyl-1,4-hexadiene, 3-alkyl-2,4-hexadiene, 6-alkyl-2,4-hexadiene.
(4) 2,3-dialkyl-1,3-butadiene→4,5-dialkyl-1,4-hexadiene, 2,3-dialkyl-2,4-hexadiene.
(5) 1,4-dialkyl-1,3-butadiene→4,6-dialkyl-1,4-hexadiene, 3,5-dialkyl-1,4-hexadiene.
(6) 2-phenyl-1,3-butadiene→4-phenyl-1,4-hexadiene.

On the other hand, when propylene is used as the alpha-olefin, the hexadiene obtained is as follows:

butadiene→2-methyl-1,4-hexadiene and 2-methyl-1,3-hexadiene.

Further, as the starting conjugated diolefinic hydrocarbon material it is also possible to use, for example, the hexadiene-2,4 obtained by isomerization of hexadiene-1,4.

According to the present invention, it is possible to provide, as hereinbefore described, a broad ranges of hexadienes on a commercial scale, using a low-cost catalyst. The so obtained hexadienes, for example, hexadiene-1,4, are useful without further treatment as monomers for polymerization or copolymerization in the plastic, rubber, textile and adhesive fields. In addition, they are also important as intermediates of those valuable compounds having two functional groups.

For a clear understanding of the present invention, the following examples are given. Unless otherwise indicated, the percentages are on a weight basis.

Example 1

The solvent and reagents were charged to a magnetic stirrer-equipped 200-cc. autoclave under an atmosphere of nitrogen, in the following order: 50 cc. of toluene, 0.5 millimol of cobalt (II) chloride, 1 millimol of phosphorus (III) chloride, 50 cc. of liquified butadiene and 7.3 millimols of triethylaluminum. The autoclave was closed and ethylene was introduced under pressure, after which the reaction was carried out by heating and maintaining the ethylene pressure such that it would be 40 kg./cm.$^2$ at 80–104° C. The resulting product was analyzed by means of gas chromatography with the following results:

|  | Grams |
|---|---|
| Hexadiene-1,4 | 47.4 |
| Hexadiene-2,4 | 7.1 |
| $C_8$-dienes | 4.5 |

Residues other than the above amounted to 1.9 grams. $C_8$ dienes were the reaction products of hexadiene-2,4 (1,4-dimethyl-1,3-butadiene) and ethylene.

Example 2

Excepting that the reaction was carried out for 2 hours, Example 1 was repeated otherwise under identical conditions, with the following results:

|  | Grams |
|---|---|
| Hexadiene-1,4 | 41.4 |
| Hexadiene-2,4 | 3.7 |
| $C_8$-dienes | 1.5 |

The high boiling products amounted to 1.6 grams.

Example 3

When the experiment was carried out as in Example 1, except that triethyl phosphine was used as the phosphorus compound and the reaction was carried out for 2 hours at a reaction temperature of 98–102° C. and an ethylene pressure of 38 kg./cm.$^2$ g., 8.9 grams of hexadiene-1,4, 1.2 grams of hexadiene-2,4 and 3.5 grams of hexadiene-1,3 were obtained. Besides these, 0.5 gram of $C_8$-dienes and 7.3 grams of straight-chain dimers of butadiene were obtained as by-products.

Examples 4–5

Example 3 was repeated except that tributylphosphine [$(C_4H_9)_3P$] and triphenyl phosphine were used as the phosphorus compound, with the following results:

| Ex. | Phosphorus compound | Products, g. | | |
|---|---|---|---|---|
| | | Hexadiene-1,4 | Hexadiene-1,3 | Hexadiene-2,4 |
| 4 | $(C_4H_9)_3P$ | 0.3 | 3.3 | 0.4 |
| 5 | $(C_6H_5)_3P$ | 0.6 | 2.6 | 0.3 |

Examples 6–15

A reaction vessel was charged with 0.5 millimol of cobalt (II) chloride, 1 millimol of a phosphorus compound indicated in the following table, 7–8 millimols of an aluminum compound likewise indicated in the following table, 50 cc. of liquified butadiene and 50 cc. of toluene, following which the reaction was carried out for 2 hours at a temperature of 90–100° C. with an ethylene pressure of 30–40 kg./cm.$^2$ g. The results obtained by the various combinations are presented in the following table.

| Ex. | Phosphorus compound/aluminium compound | Products, s. | | | | | | |
|---|---|---|---|---|---|---|---|---|
| | | 3-MPD[1] | HD-1,4[2] | HD-1,3 | HD-2,4 | C8[4] | BD-dimer[5] | Residue[6] |
| 6 | Et3P-Et2AlCl | | 1.4 | | 2.9 | 1.3 | | 3.5 |
| 7 | Bu3P-Et2AlCl | 2.4 | 5.8 | | | | | 12.3 |
| 8 | Bu3P-i-Bu3Al | 9.5 | 4.8 | | 0.5 | | | 0.8 |
| 9 | Ph3P-i-Bu3Al | | 0.8 | 2.7 | 1. | | 4.7 | 13.5 |
| 10 | Ph3-Et2AlCl | 0.9 | 1.6 | | 1.8 | 0.3 | 0.3 | 13.5 |
| 11 | PCl3-i-Bu3Al | | 10 | | 0.1 | | | 1.3 |
| 12 | PhPCl2 | | 3.5 | | 0.3 | | | (3) |
| 13 | PhPEt2-Et3Al | | 2.3 | 3.9 | 9.7 | | 6.4 | 11.9 |
| 14 | PhPEt2-i-Bu3Al | | 5.4 | 5.05 | 1.4 | | 12.0 | 18.3 |
| 15 | PhPEt2-Et2AlCl | | 1.0 | | 1.6 | 1.7 | | 16.3 |

[1] 3-methylpentadiene-1,4.
[2] Hexadiene.
[3] Large amount.
[4] C8 dienes, formed by the reaction of 2,4-dienes with ethylene.
[5] Butadiene dimers (3-methylheptatriene-1,4,6, n-octatriene-1,3,6).
[6] Distillation residue at normal atmospheric pressure.

Example 16

When Example 1 was repeated except that the reaction was carried out for 2 hours using phenyl dichlorophosphine as the phosphorus compound, 4.9 grams of hexadiene-1,4 were obtained.

Example 17

Excepting that triisobutylaluminum was used instead of triethylaluminum in Example 12, the procedures described therein were followed to obtain 36.8 grams of hexadiene-1,4. There was no substantial formation of isomerized products and butadiene dimers. The distillation residue amounted to only 0.8 gram.

Examples 18-21

A magnetic stirrer-equipped 200-cc. autoclave was charged with the following starting materials in the order given: 50 cc. of toluene, 1 millimol of a cobalt compound indicated in the following table, 2 millimols of diphenyl phosphine, liquified butadiene and 8 millimols of an organic aluminum compound likewise shown in the following table. This reaction system was then raised to the prescribed temperature and the reaction was carried out for 3 hours with an ethylene pressure of 40 kg./cm.² Results shown in the following table were obtained.

| Ex. | Cobalt compound | Aluminum compound | Butadiene, cc. | Temperature, °C. | Products, g. | | |
|---|---|---|---|---|---|---|---|
| | | | | | Hexadiene-1,4 | 2,4-dienes | C8 dienes |
| 18 | CoCl2 | (C2H5)3Al | 54 | 82-96 | 42.3 | 6.1 | 0.9 |
| 19 | CoCl2 | (C2H5)3Al | 52 | 62-68 | 36.5 | 0.6 | 0.8 |
| 20 | Co(C5H7O2)3 | (C2H5)3Al | 50 | 47-52 | 36.6 | 2.3 | 1.6 |
| 21 | CoCl2 | (C2H5)2AlCl | 50 | 72-80 | 37.5 | 6.8 | 22 |

The formation of 2,4-dienes suggests that this catalyst system has isomerizing activity.

C8 dienes are formed by the reaction of 2,4-dienes with ethylene. Thus, this suggests that the reaction of an alkyl-substituted 1,3-diene with ethylene is catalyzed with this catalyst.

Example 22

When the reaction of Example 22 was carried out using isoprene instead of butadiene, 4.8 grams of hexadienes were obtained.

Example 23

An ethylene gas-purged 100 cc. autoclave was charged with 20 cc. of toluene, 1 gram (4 millimols) of diphenylchlorophosphide and 0.134 gram (1 millimol) of cobalt (II) chloride, following which 26 cc. of liquified butadiene were charged to the autoclave by means of distillation. After further addition of 5 cc. of toluene solution containing 10 millimols of triethylaluminum, the mixture was stirred for 15 minutes at room temperature, followed by introduction of ethylene under pressure and heating with stirring. The ethylene pressure was maintained at 40 kg./cm² during the stirring which was continued for 5 hours. The reaction solution was taken out and methanol and dilute hydrochloric acid were added thereto, in the order given, to decompose the catalyst. When the oil layer was distilled, 16.1 grams of hexadiene-1,4, 6.7 grams of hexadiene-2,4 and 1.5 grams of a mixture of 3-ethyl-1,4-hexadiene and 3-methyl-1,4-heptadiene were obtained. The high boiling distillation residue from toluene amounted to 0.6 gram.

Examples 24-26

The procedures described in Example 23 were followed except that 4 millimols of a phosphorus compound indicated in the following table were used instead of 4 millimols of diphenylchlorophosphide. The results obtained are shown in the following table.

| Ex. | Phosphorus compound | Reaction time, hr. | Hexadiene-1,4, g. | Hexadiene-2,4, g. | C8 diolefins, g. |
|---|---|---|---|---|---|
| 24 | Bis(p-chlorophenyl) chlorophosphide | 1 | 18.4 | 3.6 | |
| 25 | Butyl dichlorophosphide | 0.7 | 18.9 | 3.5 | 0.6 |
| 26 | Diphenyl benzene-phosphinate | 5 | 10.3 | 0.2 | |

Example 27

A 100-cc. autoclave was charged with 10 cc. of toluene, 0.35 gram of butyl chlorophosphide and 5 cc. of a toluene solution containing 10 millimols of triethylaluminum. The autoclave was then cooled and 26 cc. of liquified butadiene were charged thereto by means of distillation. 0.178 gram (0.5 millimol) of cobalt (III) acetylacetonate dissolved in 10 cc. of toluene was further added. After stirring the mixture for 15 minutes at room temperature, ethylene was introduced under a pressure of 40 kg./cm.² and the stirring was continued for 1 hour at 80° C., whereupon were obtained 21.6 grams of hexadiene-1,4 and 0.8 gram of hexadiene-2,4. The high boiling residue amounted to 0.6 gram.

Example 28

Except that 0.5 millimol of cobalt anhydride was used instead of cobalt (III) acetylacetonate of Example 27, the reaction was otherwise carried out as in said example, 18.2 grams of hexadiene-1,4 and 3.6 grams of hexadiene-2,4 were obtained.

Example 29

100-cc. autoclave was charged with 20 cc. of xylene, 0.5 gram (2 millimols) of diphenyl chlorophosphide 0.067 gram (0.5 millimol) of cobalt (II) chloride and 20.4 grams of isoprene. 5 cc. of a xylene solution containing 10 millimols of diisobutylaluminum hydride were also added. Ethylene was introduced at a pressure of 40 kg./cm.$^2$ and the reaction mixture was stirred for 4 hours at 80° C. 22.8 grams of a mixture of 4-methyl-1,4-hexadiene and 5-methyl-1,4-hexadiene were obtained.

Example 30

A 100-cc. autoclave was charged with 20 cc. of xylene, 0.067 gram (0.5 millimol) of cobalt (II) chloride, 0.35 gram (2 millimols) of butyl dichlorophosphide and 24.6 grams of hexadiene-2,4, after which were further added 5 cc. of a xylene solution containing 10 millimols of triethylaluminum. Ethylene was introduced under a pressure of 40 kg./cm.$^2$ and the stirring was continued for 4 hours at 90° C. Thus were obtained 6.9 grams of a mixture of 3-ethyl-1,4-hexadiene and 3-methyl-1,4-heptadiene.

Example 31

A magnetic stirrer-equipped 200-cc. autoclave was charged with 50 cc. of toluene, after which were added under a nitrogen atmosphere 1 millimol (0.1298 g.) of cobalt (II) chloride and in an amount of 50 cc. cylinder-contained butadiene which had been vaporized, purified and thereafter condensed and liquified at a temperature obtained by a Dry Ice-methanol bath. After further addition to the system of 8 millimols of triethylaluminum the autoclave was closed. The temperature of the system was then raised by heating, and when 80° C. was reached, ethylene was gradually introduced under pressure, the reacting being carried out while maintaining so far as possible a temperature of 80° C. The reaction time was 2 hours, and the minimum ethylene pressure was 50 kg./cm.$^2$ g.

After decomposing the catalyst, the reaction mixture was washed, dried and distilled. Upon analyzing the distillate by means of gas chromatography, it was found to contain the following products:

|  | Grams |
|---|---|
| Hexadiene-1,4 | 7.6 |
| Hexadiene-2,4 | 18.3 |
| $C_8$ dienes | 1.4 |
| Butadiene dimers | 1.5 |

The distillation residue at normal atmospheric pressure amounted to 10 grams. The hexadiene-2,4 is a result of the isomerization of hexadiene-1,4. On the other hand, the $C_8$ dienes are formed by the reaction of hexadiene-2,4 with ethylene. These facts indicate that first of all hexadiene-1,4 is formed with considerably high activity by this catalyst system, that this catalyst system has the ability of isomerizing the 1,4-dienes to 2,4-dienes, and further that the alkyl-substituted dienes as 1,3-dienes react with ethylene by means of this catalyst.

Example 32

Example 31 was repeated except that PSCl$_3$ was used instead of POCl$_3$, with the consequence that the following products were obtained.

|  | Grams |
|---|---|
| 3-methyl-1,4-pentadiene | 0.5 |
| Hexadiene-1,4 | 12.1 |
| Hexadiene-2,4 | 0.8 |
| Residue | 3.2 |

Example 33

The reaction was carried out using the same catalyst system as in Example 32. 1.5 grams of methyl-1,4-hexadiene were obtained.

Example 34

The reaction as described in Example 31 was carried out at 50° C. 31.7 grams of hexadiene-1,4, 18.9 grams of hexadiene-2,4 and 6.9 grams of $C_8$ dienes were obtained. 1.8 grams of high boiling products were formed. When the reaction was carried out at 30° C., no isomerized products were present at all, but the yield was somewhat less.

This three-component catalyst is characterized in that it possess activity at relatively low temperature.

Example 35

A 100-cc. autoclave purged with ethylene gas was charged with 20 cc. of toluene, 0.827 gram (2 millimols) of tri-p-chlorophenyl-phosphite and 0.067 gram (0.5 millimol) of cobalt (II) chloride, after which 26 cc. of liquified butadiene were also charged thereto by means of distillation. After further addition of 5 cc. of a toluene solution containing 10 millimols of triethylaluminum, the mixture was stirred for 15 minutes at room temperature, following which ethylene was introduced under pressure. The reaction mixture was then heated at 80° C. with stirring, the pressure of the ethylene being maintained at 40 kg./cm.$^2$ during the stirring. After stirring for 1 hour and 20 minutes, no further absorption of ethylene was observed. The reaction solution was then taken out and the catalyst was decomposed by adding methanol and dilute hydrochloric acid, in the order given. Upon distillation of the oil layer, 22.8 grams of hexadiene-1,4 (93% based on the starting butadiene) and 0.2 gram of hexadiene-2,4 were obtained. Other distillable products were not observed at all. The amount of high boiling distillation residue from the toluene was 0.8 gram.

Examples 36–39

Example 35 was repeated, using the phosphites indicated in the following table instead of tri-p-chlorophenyl-

| Example | Phosphite compound | Reaction time, hr. | Hexadiene −1,4, g. | Hexadiene −2,4, g. | High boiling residue, g. |
|---|---|---|---|---|---|
| 36 | P(O—C$_6$H$_5$)$_3$ | 2 | 21.7 | 0.8 | 0.5 |
| 37 | P(O—C$_6$H$_4$-CH$_3$)$_3$ (para) | 2 | 22.6 | 0.2 | 0.6 |
| 38 | P(O—C$_6$H$_4$-CH$_3$)$_3$ (meta) | 2 | 15.6 | 0.3 | 0.8 |
| 39 | P(OC$_2$H$_5$)$_3$ | 2 | 10.5 | 0 | 0.2 | phosphite. The other conditions were otherwise the same as those used in Example 35. The results obtained are shown in the preceding table.

Example 40

A 100-cc. autoclave was charged with 10 cc. of toluene, 1.2 grams of triphenylphosphite and 5 cc. of a toluene solution containing 20 millimols of triethylaluminum. After cooling the autoclave, 26 cc. of liquified butadiene was charged thereto by means of distillation. Further addition was made of 0.178 gram (0.5 millimol) of cobalt (III) acetylacetonate dissolved in 10 cc. of toluene. After stirring the mixture for 30 minutes at room temperature, ethylene under a pressure of 40 kg./cm.$^2$ was introduced and the stirring was continued for 3 hours at 80° C. 22.8 grams of hexadiene-1,4 and 0.5 gram of hexadiene-2,4 were obtained. The high boiling residue amounted to 0.8 gram.

Example 41

When an experiment was carried out, using 0.5 millimol of cobalt anhydride instead of 0.5 millimol of cobalt (III) acetylacetonate in Example 40 with the conditions being otherwise the same as in said example, 18.7 grams of hexadiene-1,4 and 0.2 gram of hexadiene-2,4 were obtained.

Example 42

A 100-cc. autoclave was charged with 20 cc. of xylene, 0.62 gram (2 millimols) of triphenylphosphite, 0.067 gram (0.5 millimol) of cobalt (II) chloride and 20.4 grams of isoprene, after which 5 cc. of a xylene solution containing 10 millimols of tri-n-butylaluminum were also added. Ethylene was introduced under a pressure of 40 kg./cm.$^2$, and the stirring of the reaction mixture was carried out for 4 hours at 80° C. 10.2 grams of a mixture of 4-methyl-1,4-hexadiene and 5-methyl-1,4-hexadiene were obtained.

Example 43

A 100-cc. autoclave was charged with 20 cc. of xylene, 0.62 gram (2 millimols) of triphenylphosphite, 0.067 gram (0.5 millimol) of cobalt (II) chloride, 22.7 grams of 1,3-pentadiene (purity 90%) and 2 cc. of diisobutylaluminum hydride. After purging the air inside the autoclave with ethylene gas, ethylene was introduced under a pressure of 40 kg./cm.$^2$, after which the stirring was carried out for 2.5 hours at 80° C. 8.2 grams of 3-methyl-1,4-hexadiene and 0.9 gram of 1,4-heptadiene were obtained.

Examples 44–48

A magnetic stirrer-equipped 200-cc. autoclave was charged with 20 cc. of toluene, a cobalt compound indicated in the following table, phosphorus (III) chloride, 60 cc. of liquified butadiene and 8 millimols of triethylaluminum, and then closed. The reactions were carried out at the temperatures indicated below by building up a pressure of 50 kg./cm.$^2$ (gauge) with ethylene. The results obtained were as follows:

Example 50

This example and Examples 51 and 52 will illustrate a method wherein a cobalt complex is first formed from a cobalt compound and a phosphorous compound and then this cobalt complex is used as a catalyst.

A $Co(SCN)_2 \cdot [P(C_6H_5)_3]_2$ complex which exhibits a green color and has a melting point of 80–81° C. was formed from $Co(SCN)_2$ and triphenyl phosphine.

A 200-cc. autoclave was charged with 20 cc. of toluene, 2 millimols of a $Co(SCN)_2 \cdot [P(C_6H_5)_3]_2$ complex, 50 cc. of liquified butadiene and 1 cc. of $(C_2H_5)_3Al$, in the order given. Ethylene was then introduced to a pressure of 40 kg./cm.$^2$, the reaction temperature was adjusted to 80° C., and the reaction was continued for 5 hours. The reaction product was treated in customary manner, following which it was analyzed. As a result, it was confirmed that the following substances were contained therein.

| Components | Weight, g. |
|---|---|
| Hexadiene-1,4 | 31.6 |
| Hexadiene-2,4 | 0.7 |
| Butadiene dimers | 4.4 |
| Distillation residue at normal atmospheric pressure | 2.5 |

Example 51

When 0.5 cc. of $(C_2H_5)_3Al$ was used instead of 1 cc. in Example 50, a reaction product consisting of the following components was obtained.

| Component | Weight, g. |
|---|---|
| Hexadiene-1,4 | 10.8 |
| $C_6$ components other than hexadiene-1,4 | 1 |
| Butadiene dimers | 0.8 |
| Distillation residue at normal atmospheric pressure | 2.7 |

Example 52

In Example 50, using as the solvent 20 cc. of ethylene chloride instead of toluene but otherwise carrying out the experiment as described therein, the following reaction product was obtained.

| Component | Weight, g. |
|---|---|
| Hexadiene-1,4 | 21.1 |
| Vinyl cyclohexene | 0.8 |
| Distillation residue at normal atmospheric pressure | 3.4 |

What we claim is:

1. A process for preparing hexadienes which comprises reacting an alpha-monoolefin selected from the group consisting of ethylene and propylene with a conjugated diene in the presence of a catalytic amount of a composition comprising the following three components:

| Ex. | Cobalt compound | Millimol | PCl$_2$, mmol | Temperature, ° C. | Reaction time, hr. | Product, g. | | | | |
|---|---|---|---|---|---|---|---|---|---|---|
| | | | | | | HD-1,4 | HD-2,4 | C$_8$ dienes | Others | Residue |
| 44 | Co(SCN)$_2$ | 1 | 2 | 95 | 2 | 12 | 0.2 | | 2.9 | 0.8 |
| 45 | Cobalt stearate | 1 | 2 | 95 | 0.5 | 20.4 | 7.9 | 0.8 | 1.9 | 1.9 |
| 46 | do | 0.5 | 1 | 100 | 0.5 | 28.7 | 1.9 | 0.9 | 3.1 | 6.5 |
| 47 | Basic cobalt carbonate | 1 | 2 | 100 | 2 | 8.2 | 0.2 | | 0.3 | 2.4 |
| 48 | Bis (salicylaldehyde) cobalt (II) | 1 | 2 | 100 | 2 | 7.1 | 15.6 | 11.6 | 1.3 | 13.6 |

Example 49

Excepting that as the catalysts were used 1 millimol of cobalt (III) acetylacetonate, 2 millimols of PCl$_3$ and 5 millimole of an organic aluminum compound of the formula Et$_4$Al$_2$SO$_4$ and the reaction was carried out for 1 hour, the experiment was otherwise conducted as in Example 35, whereby 25.2 grams of hexadiene-1,4 were obtained.

(I) a cobalt compound selected from the group consisting of:
  (1) inorganic salts of cobalt selected from the group consisting of halides, thiocyanate, sulfate, nitrate and carbonate thereof,
  (2) carboxylates of cobalt, and
  (3) complexes of cobalt with a member selected from beta-ketones and beta-keto carboxylic acid esters;

(II) a phosphorus compound selected from the group consisting of the phosphorus compounds having the following formulas:
(1) $PR_mX_{3-m}$,
(2) $P(OR)_nX_{3-n}$, and
(3) $P(Z)X_3^2$ wherein R is a member selected from the group consisting of alkyls, aryls, and substituted aryls, X is a member selected from the group consisting of hydrogen, halogens, alkyls and aryls, $X^2$ is a member selected from the group consisting of halogens and halogen-substituted alkoxys, Z is a member selected from the group consisting of sulfur and oxygen, $m$ is an integer selected from the group consisting of 0, 1, 2 and 3, and $n$ is an integer selected from the group consisting of 1, 2 and 3; and (III) an organoaluminum compound selected from the group consisting of the compounds having the following formulas:
(1) $R_3^2Al$ and
(2) $R_4^2Al_2SO_4$ wherein $R^2$ is a monovalent hydrocarbon group.

2. The process according to claim 1 wherein said alpha-monoolefin is ethylene.

3. The process according to claim 1 wherein said alpha-monoolefin is propylene.

4. The process according to claim 1 wherein said conjugated diene is butadiene.

5. The process according to claim 1 wherein said conjugated diene is isoprene.

6. The process according the claim 1 wherein said composition is one in which the mole ratio of said phosphorus compound to said cobalt compound ranges between 0.5–30:1, and the mole ratio of said organoaluminum compound to said cobalt compound ranges between 1–200.

7. The process according to claim 6 wherein said composition is used in an amount ranging between 0.0001 and 0.2 mol for every mol of said conjugated diene.

References Cited

UNITED STATES PATENTS

| | | | |
|---|---|---|---|
| 3,040,016 | 6/1962 | Balas et al. | 260—94.3 |
| 3,066,128 | 11/1962 | Youngman | 260—94.3 |
| 3,219,716 | 11/1965 | Wittenberg et al. | |
| 3,306,948 | 2/1967 | Kealy | 260—680 |

PAUL M. COUGHLAN, JR., Primary Examiner

U.S. Cl. X.R.

252—428, 429

UNITED STATES PATENT OFFICE
CERTIFICATE OF CORRECTION

Patent No. 3,496,247                           February 17, 1970

Sadao Yuguchi et al.

It is certified that error appears in the above identified patent and that said Letters Patent are hereby corrected as shown below:

Column 2, line 60, "(1) $R_1^2 AlX_{3-1}^3$ and" should read -- (1) $R_\ell^2 AlX_{3-\ell}^3$ and --. Column 3, line 14, "aid" should read -- acid --; line 17, "aid" should read -- acid --; same line 17, "obalt" should read -- cobalt --. Column 5, line 29, "substances" should read -- substance --. Column 7, line 7, "PHPC12" should read -- PhPC12 - Et2AlCl --; line 3, "9.5" should read -- 0.5 --; line 8, "9.7" should read -- 0.7 --. Column 9, line 47, "1.4" should read -- 14 --. Column 11, line 32, "millimols" should read -- millimol --; line 72, "millimole" should read -- millimols --.

Signed and sealed this 24th day of November 1970.

(SEAL)
Attest:

EDWARD M. FLETCHER, JR.                        WILLIAM E. SCHUYLER, JR.
Attesting Officer                                  Commissioner of Patents